US011200270B2

(12) United States Patent
Komuro et al.

(10) Patent No.: US 11,200,270 B2
(45) Date of Patent: Dec. 14, 2021

(54) INFORMATION PROVIDING SERVER AND METHOD OF CONTROLLING INFORMATION PROVIDING SERVER

(71) Applicant: GURUNAVI, INC., Tokyo (JP)

(72) Inventors: Daisuke Komuro, Kodaira (JP); Ryota Kimura, Tokyo (JP); Kazumu Sugawara, Tokyo (JP); Takao Watanabe, Tachikawa (JP)

(73) Assignee: GURUNAVI, INC., Tokyo (JP)

( * ) Notice: Subject to any disclaimer, the term of this patent is extended or adjusted under 35 U.S.C. 154(b) by 791 days.

(21) Appl. No.: 14/954,307

(22) Filed: Nov. 30, 2015

(65) Prior Publication Data
US 2016/0196259 A1 Jul. 7, 2016

(30) Foreign Application Priority Data

Jan. 7, 2015 (JP) ............... JP2015-001698

(51) Int. Cl.
G06F 16/438 (2019.01)
G06F 16/43 (2019.01)
(Continued)

(52) U.S. Cl.
CPC ............ G06F 16/438 (2019.01); G06F 16/43 (2019.01); G06F 16/9038 (2019.01); G06Q 30/0256 (2013.01)

(58) Field of Classification Search
CPC .................. G06F 17/2247; G06F 17/30; G06F 17/30554; G06F 17/3005; G06F 16/438;
(Continued)

(56) References Cited

U.S. PATENT DOCUMENTS 8,522,148 B1* 8/2013 Pry ........................ G06F 16/951
715/745
2005/0155060 A1* 7/2005 Sato ........................ G06Q 30/02
725/42
(Continued)

FOREIGN PATENT DOCUMENTS

CN 103946843 A 7/2014
CN 104059169 A 9/2014
(Continued)

OTHER PUBLICATIONS

Jan. 12, 2016 Office Action issued in Japanese Patent Application No. 2015-001698.
(Continued)

Primary Examiner — Albert M Phillips, III
Assistant Examiner — Fatima P Mina
(74) Attorney, Agent, or Firm — Oblon, McClelland, Maier & Neustadt, L.L.P.

(57) ABSTRACT

A search condition related to image and text stored in a first database is associated with the image and the text, and an information providing unit selects the image and the text associated with a received search condition from among images related to a facility associated with a facility information extracted by a search processing unit and the text describing the service provided at the facility, generates search result guide data in which the extracted facility information and the selected image and the selected text are included, and provides the search result guide data to a user terminal.

13 Claims, 12 Drawing Sheets

(51) Int. Cl.
*G06Q 30/02* (2012.01)
*G06F 16/9038* (2019.01)

(58) Field of Classification Search
CPC .. G06F 16/43; G06F 16/9038; G06F 16/9535; G06F 16/24578; G06F 16/33; G06F 16/3323; G06Q 30/02; G06Q 30/0601; G06Q 30/06311; G06Q 30/0261; G06Q 30/0256; G06Q 30/0282; G06Q 30/0631; G06Q 30/0263; G06Q 50/12
See application file for complete search history.

(56) References Cited

U.S. PATENT DOCUMENTS

| | | | | |
|---|---|---|---|---|
| 2011/0194843 | A1* | 8/2011 | Harada | H04N 5/77 386/326 |
| 2011/0238495 | A1* | 9/2011 | Kang | G06Q 30/02 705/14.49 |
| 2012/0005045 | A1* | 1/2012 | Baker | G06F 16/335 705/27.2 |
| 2012/0170855 | A1* | 7/2012 | Maeda | G06F 16/583 382/218 |
| 2012/0329527 | A1* | 12/2012 | Kang | H04N 13/0059 455/566 |
| 2013/0031506 | A1* | 1/2013 | Diaz | G06Q 50/12 715/781 |
| 2014/0108541 | A1* | 4/2014 | Kawai | H04L 67/22 709/204 |
| 2014/0114847 | A1* | 4/2014 | Watanabe | G06Q 40/00 705/39 |
| 2015/0066982 | A1* | 3/2015 | Yoshioka | G06F 17/30675 707/770 |
| 2015/0262282 | A1* | 9/2015 | Walti | G06Q 30/0631 705/26.7 |

FOREIGN PATENT DOCUMENTS

| | | |
|---|---|---|
| JP | 2002-041624 | 2/2002 |
| JP | 2010-086499 A | 4/2010 |
| JP | 2010-237721 A | 10/2010 |
| JP | 2012-203587 A | 10/2012 |
| JP | 2012-215930 A | 11/2012 |
| WO | 2007/091587 A1 | 8/2007 |

OTHER PUBLICATIONS

Anonymous: "Content API/ Documentation/ /location, TripAdvisor Developer Portal", Dec. 7, 2014 (Dec. 7, 2014), XP055275224, Retrieved from Internet: URL:https://web.archive.org/web/20141207044749/http://developer-tripadvisor.com/content-api/documentation/location/[retrieved om May 25, 2016].
Jun. 3, 2016 Extended Search Report issued in European Patent Application No. 15197299.9.
Mar. 29, 2018 Office Action issued in European Patent Application No. 15 197 299.9.
Chinese Office Action with English translation dated Mar. 5, 2020 in corresponding Chinese patent application No. 201510862684.0, (23 pages).
Korean Office Action with English translation dated Apr. 16, 2019 in corresponding Korean patent application No. 10-2015-0168809, (12 pages).
Chinese Office Action with English translation dated Nov. 18, 2020 in corresponding Chinese Patent Application No. 201510862684.0, (25 pages).

* cited by examiner

FIG. 2

STORE DATABASE 20

| STORE ID (20a) | BASIC STORE INFORMATION (20b) | FIXED/ CHANGED (20c) | STORE INTRODUCTION IMAGE ① (20d) | STORE INTRODUCTION IMAGE ② (20e) | STORE INTRODUCTION IMAGE ③ (20f) | STORE INTRODUCTION IMAGE ④ (20g) | STORE INTRODUCTION IMAGE ⑤ (20h) | STORE INTRODUCTION IMAGE ⑥ (20i) |
|---|---|---|---|---|---|---|---|---|
| S00**1 | TAVERN ○○ PHONE NUMBER ***** STORE PR SENTENCE : FRESH * ADDRESS : TOKYO **** | CHANGED | CATEGORY : DRINK  SPECIFIC KEYWORD : WANT TO DRINK BEER IMAGE : ***.jpeg (BEER) TEXT : GERMAN BEER ...... | CATEGORY : STORE CAPABLE OF PROVIDING PRIVATE ROOM, SEAT, AND CHARTER  SPECIFIC KEYWORD : PRIVATE ROOM IMAGE : ***.jpeg (PRIVATE TATAMI ROOM) TEXT : IN PRIVATE ROOM ...... | CATEGORY : STORE CAPABLE OF PROVIDING PRIVATE ROOM, SEAT, AND CHARTER  SPECIFIC KEYWORD : COUPLE PRIVATE ROOM IMAGE : ***.jpeg (COUPLE PRIVATE ROOM) TEXT : TO COUPLE ...... | CATEGORY : DRINK  SPECIFIC KEYWORD : WANT TO DRINK WINE IMAGE : ***.jpeg (WINE) TEXT : WINE ** ...... | CATEGORY : DRINK  SPECIFIC KEYWORD : WANT TO DRINK SHOCHU IMAGE : ***.jpeg (BANQUET SHOCHU) TEXT : VARIOUS ...... | CATEGORY : SEARCH FROM SCENE PURPOSE  SPECIFIC KEYWORD : JOINT PARTY *** IMAGE : ***.jpeg (BANQUET HALL) TEXT : ...... |

| | | | | | | | |
|---|---|---|---|---|---|---|---|
| S00**2 | ROBATAYAKI O△ PHONE NUMBER ***** STORE PR SENTENCE: IN FOODSTUFF ** ADDRESS: TOKYO ***** | CHANGED | CATEGORY: DRINK SPECIFIC KEYWORD: WANT TO DRINK BEER IMAGE: ***.jpeg (BEER) TEXT: WORLD ......... | CATEGORY: DRINK SPECIFIC KEYWORD: WANT TO DRINK SAKE IMAGE: ***.jpeg (WINE) TEXT: SAKE ** ......... | CATEGORY: STORE CAPABLE OF PROVIDING PRIVATE ROOM, SEAT, AND CHARTER SPECIFIC KEYWORD: CHARTER IMAGE: ***.jpeg (PRIVATE TATAMI ROOM) TEXT: SUNKEN KOTATSU | CATEGORY: DRINK SPECIFIC KEYWORD: WANT TO DRINK SHOCHU IMAGE: ***.jpeg (SHOCHU) TEXT: POTATO SHOCHU | CATEGORY: NO SMOKING AND SMOKING SPECIFIC KEYWORD: NO SMOKING IN STORE IMAGE: ***.jpeg (NO SMOKING IN PRIVATE ROOM) TEXT: TO COUPLE | CATEGORY: STORE CAPABLE OF PROVIDING PRIVATE ROOM, SEAT, AND CHARTER SPECIFIC KEYWORD: PRIVATE ROOM IMAGE: ***.jpeg (PRIVATE TATAMI ROOM) TEXT: IN PRIVATE ROOM ......... |
| S00**3 | | FIXED | --- | --- | --- | --- | --- | --- |

FIG. 3

DISPLAY RANK SETTING DATABASE 30

| STORE ID | DISPLAY RANK OF SPECIFIC KEYWORD | | | | |
|---|---|---|---|---|---|
| | DISPLAY RANK NO.1 WANT TO DRINK BEER IMAGE : BEER | DISPLAY RANK NO.2 COUPLE PRIVATE ROOM IMAGE : COUPLE PRIVATE ROOM | DISPLAY RANK NO.3 PRIVATE ROOM IMAGE : PRIVATE TATAMI ROOM | DISPLAY RANK NO.4 CHARTER IMAGE : BANQUET HALL | DISPLAY RANK NO.5 WANT TO DRINK WINE IMAGE : WINE |
| S00∗∗1 | | | | | |
| S00∗∗2 | DISPLAY RANK NO.1 WANT TO DRINK BEER IMAGE : BEER | DISPLAY RANK NO.2 COUPLE PRIVATE ROOM IMAGE : COUPLE PRIVATE ROOM | DISPLAY RANK NO.3 WANT TO DRINK SHOCHU IMAGE : SHOCHU | DISPLAY RANK NO.4 PRIVATE ROOM IMAGE : PRIVATE TATAMI ROOM | DISPLAY RANK NO.5 WANT TO DRINK SAKE IMAGE : SAKE |
| ------------- | ------------- | | | | |

FREE WORD CONVERSION TABLE 40

| FREE WORD | SEARCH CATEGORY/SPECIFIC KEYWORD |
|---|---|
| DRINK TOGETHER | STORE CAPABLE OF PROVIDING PRIVATE ROOM, SEAT, AND CHARTER |
| LOTS OF LOCAL SAKE | DRINK/WANT TO DRINK SAKE |
| BELGIAN BEER | DRINK/WANT TO DRINK BEER |
| | |

40a — FREE WORD column
40b — SEARCH CATEGORY/SPECIFIC KEYWORD column

INFORMATION PROVIDING SERVER AND METHOD OF CONTROLLING INFORMATION PROVIDING SERVER

INCORPORATION BY REFERENCE

The disclosure of Japanese Patent Application No. 2015-6098 filed on Jan. 7, 2015 including the identification, drawings and abstract is incorporated herein by reference in its entirety.

BACKGROUND OF THE INVENTION

1. Field of the Invention

The present invention relates to an information providing server that provides information according to a received search condition. For example, the present invention relates to an information providing server that searches a database based on a search condition that a user inputs to a user terminal and provides a result of the search to the user terminal, and a method of controlling the information providing server.

2. Description of Related Art

A system that searches a database based on a search condition that a user inputs to a user terminal such as a personal computer (PC) or a smart phone and provides a result of the search to the user terminal is known.

For example, Japanese Unexamined Patent Application Publication No. 2012-203587 discloses a server device that receives a search condition of stores transmitted from a user terminal, generates a store list satisfying the search condition received from a store database, and transmits the store list to the user terminal. When this server device receives selection of the store presented in the store list from the user terminal, the server device generates a store page (see FIG. 7) to introduce the received store and transmits the store page to the user terminal. Further, images (foods and an appearance of the store) of the store are included in the store page described in Japanese Unexamined Patent Application Publication No. 2012-203587, in addition to a store name, a phone number, PR text of the store, and the like. The user is allowed to visually image the store.

Further, Japanese Patent Application Publication No. 2010-237721 discloses a search system that creates an abstract of searched content in consideration of a search condition (a search keyword or a viewpoint), and provides the abstract to a user terminal. Specifically, the search system described in Japanese Unexamined Patent Application Publication No. 2010-237721 includes a) a database that stores one or more contents, in which a viewpoint according to the content among one or more viewpoints that words have is imparted to the words that can be a search keyword in each content, b) search means for searching the database based on the search keyword included in a search request input from input means, c) a search result output means for outputting a search result of the searching means from output means, and d) a viewpoint acquisition means for determining that the viewpoint imparted to the words matching the search keyword within the content selected by the user among the content included in the search result of the searching means is a search viewpoint of a user, and acquiring the viewpoint. This search system determines a degree of importance of the words included in the content of which the abstract is required to be created, in consideration of whether or not the words are words having the viewpoint acquired by the viewpoint acquisition means, and creates the abstract of the content to include the words having a high degree of importance.

SUMMARY OF THE INVENTION

Incidentally, inclusion of an image (an image of a food, appearance of the store, or the like) showing a type of store, in the search result (the store page in the example of Japanese Unexamined Patent Application Publication No. 2012-203587) searched based on the search condition input to the user terminal, as in the server described in Japanese Unexamined Patent Application Publication No. 2012-203587 described above, is widespread. However, for the image included in the search result (for example, the above-described store page), a predetermined image is used regardless of the search condition input by the user. For example, the server described in Japanese Unexamined Patent Application Publication No. 2012-203587 described above displays the same image in the store page, even when the user inputs any search condition. Accordingly, the user cannot simply determine whether or not the search result (the store page in the example of Japanese Unexamined Patent Application Publication No. 2012-203587) satisfies his or her desired conditions (search condition) based on the search result.

Therefore, when there is a system that displays the search result (for example, searched store information) including the images related to the search condition input by the user, the user cannot simply visually determine whether or not the search result satisfies his or her conditions (search condition). However, the system that displays a search result including the image related to the search condition input by the user is not known at present. In the search system described in Japanese Unexamined Patent Application Publication No. 2010-237721, an abstract of searched content is presented as text to the user, and the user must read the abstract and cannot simply determine whether or not the search result satisfies his or her desired conditions (search condition).

The present invention provides an information providing server that provides a result of a search according to a search condition input from a user terminal, which enables a user to simply determine whether the result of the search according to the input search condition is provided, and a method of controlling the information providing server.

According to a first aspect of the present invention, an information providing server includes a first database that stores facility information of a facility identified by a facility ID, and text describing an image related to the identified facility and a service related to the image and provided at the identified facility, in association with each other for each facility ID; a search processing unit that receives an input of a search condition from a user terminal, and searches the first database using the received search condition to extract facility information satisfying the search condition; and an information providing unit that provides the facility information extracted by the search processing unit to the user terminal. A search condition related to the image and the text stored in the first database is associated with the image and the text. The information providing unit selects the image and the text associated with the received search condition from among images related to the facility associated with the facility information extracted by the search processing unit and the text describing the service provided at the facility, generates search result guide data in which the extracted facility information and the selected image and text are included, and provides the search result guide data to the user terminal.

According to a second aspect of the invention, there is provided a method of controlling an information providing server that stores facility information of a facility identified by a facility ID, and text describing an image related to the identified facility and a service related to the image and provided at the identified facility, in association with each other for each facility ID. The method of controlling an information providing server includes a search processing step of receiving an input of a search condition from a user terminal, and searching for the server using the received search condition to extract facility information satisfying the search condition; and an information providing step of providing the facility information extracted in the search processing step to the user terminal. A search condition related to the image and the text stored in the server is associated with the image and the text. The information providing step includes selecting the image and the text associated with the received search condition from among images related to the facility associated with the facility information extracted in the search processing step and text describing the service provided at the facility, generating search result guide data in which the extracted facility information and the selected image and the selected text are included, and providing the search result guide data to the user terminal.

According to the above aspects, the information providing server that provides a result of search according to a search condition input from a user terminal, which enables a user to simply determine whether the result of the search according to the input search condition is provided, and the method of controlling the information providing server are provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a schematic diagram illustrating a simulative data structure of a store database of the embodiment of the present invention;

FIG. 3 is a schematic diagram illustrating a simulative data structure of a display rank setting database of the embodiment of the present invention;

FIG. 4 is a schematic diagram illustrating a simulative data structure of a free word conversion table of the embodiment of the present invention;

DETAILED DESCRIPTION OF THE INVENTION

Figure 1:
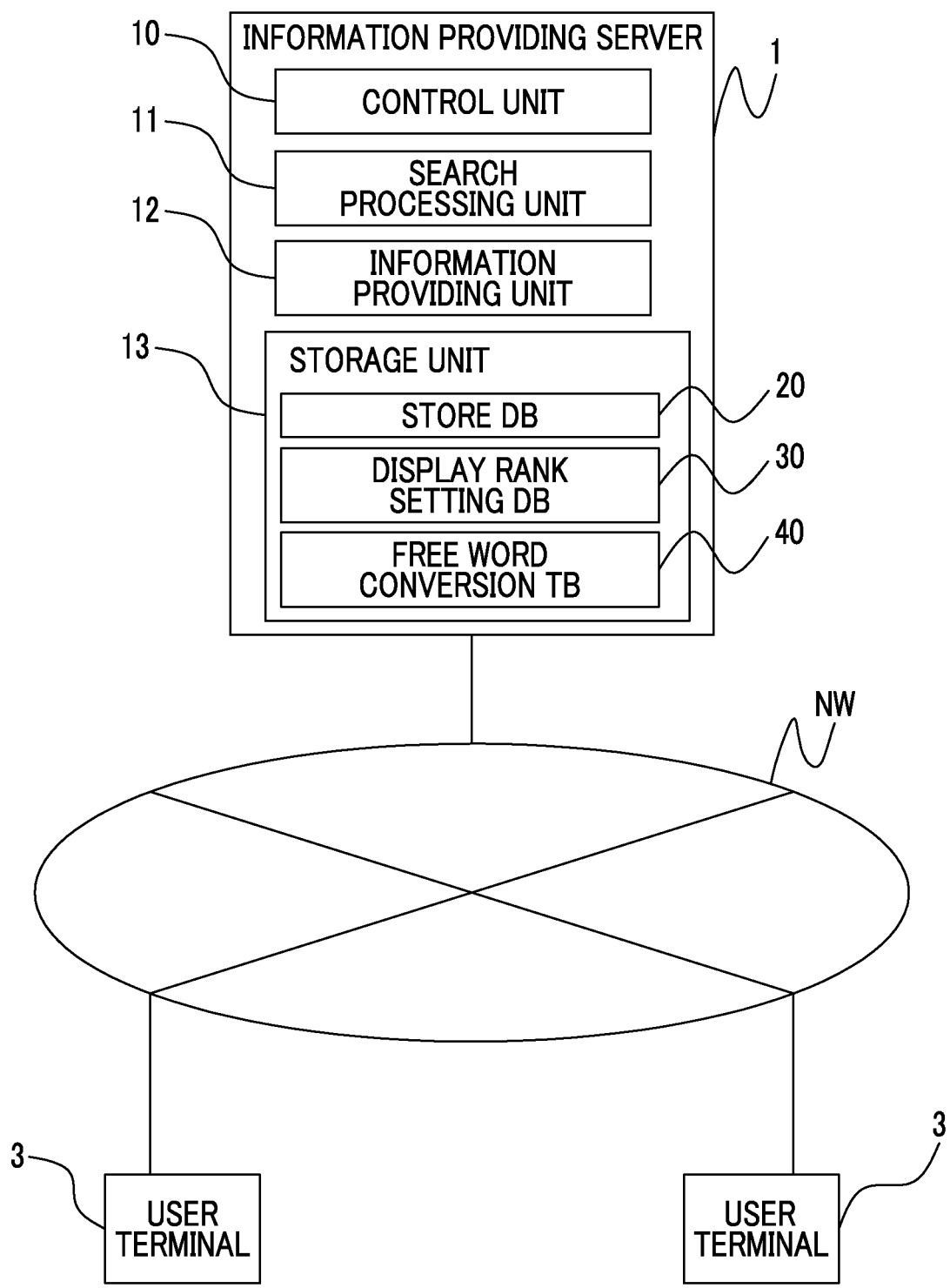
FIG. 1 is a system configuration diagram of an information providing system according to an embodiment of the present invention.

Hereinafter, embodiments of the present invention will be described with reference to the accompanying drawings. First, a configuration of the information providing system of this embodiment will be described with reference to FIGS. 1 to 4. FIG. 1 is a system configuration diagram of the information providing system of this embodiment. Further, FIG. 2 is a schematic diagram illustrating a simulative data structure of a store database according to this embodiment, FIG. 3 a schematic diagram illustrating a simulative data structure of a display rank setting database of the embodiment of the present invention, and FIG. 4 is a schematic diagram illustrating a simulative data structure a free word conversion table of this embodiment.

As illustrated in FIG. 1, the information providing system of this embodiment includes an information providing server (hereinafter, simply referred to as "server") 1 connected to a communication network NW such as the Internet, and user terminals 3 connected to the communication network NW. This server 1 performs exchange of various data with the user terminal 3. The server 1 includes one or more computers.

The server 1 receives an input of search condition from the user terminal 3, searches a store database 20 to be described below based on the received search condition, extracts store information (search target information) satisfying the search condition, and provides the searched store information to the user terminal 3. The server 1 can provide a "thumbnail image and text" selected using the received search condition together with the searched store information to the user terminal 3.

Further, the user terminal 3 includes an information processing device (an information processing device such as a PC, a PDA, a smart phone, or mobile phone), which includes a control unit having a Web browser function, a display unit including a liquid crystal display or the like, and an input unit including a keyboard, operation buttons, or the like. The user terminal 3 can access the server 1 over the communication network NW to transmit a search condition of the store to the server 1 or can receive store information transmitted from the server 1 to display the store information on the display unit.

Next, a specific configuration of the server 1 will be described. The server 1 includes a control unit 10, a search processing unit 11, an information providing unit 12, and a storage unit 13. Further, the store database 20, a display rank setting database 30, and a free word conversion table 40 are stored in the storage unit 13.

First, a configuration of each piece of data stored in the storage unit 13 in the configuration of the server 1 will be described.

The store database 20 includes records including a field 20*a* in which store identification information (store ID) is registered, a field 20*b* in which basic information (store information) of the store identified by the store ID registered in the field 20*a* is registered, a field 20*c* in which display setting information (either changed or fixed) for setting whether an image (thumbnail image) to be displayed together with the store information is to be changed and displayed or to be fixed and displayed is registered, and respective fields 20*d*, 20*e*, 20*f*, 20*g*, 20*h*, and 20*i* in which, for example, images related to the store identified by the store ID registered in the field 20*a*, and search condition related to the images are registered (includes a plurality of records provided for each store), as illustrated in FIG. 2.

Here, the store ID is unique data including, for example, alphanumeric characters, and is assigned to each store. Further, the store information is information representing, for example, "a name of the store, a phone number of the store, PR text of the store, an address of the store, map information, and menus". Further, for each registered image, search condition (a specific keyword (narrow word) and a category of the specific keyword) related to the image, and text data (text) indicating content of the image are stored in association with each other in the fields 20*d*, 20*e*, 20*f*, 20*g*, 20*h*, and 20*i*.

For example, in the field 20*d* of the uppermost record illustrated in FIG. 2, an "Image of a beer" is registered as an image related to the store, and information (category: drink, and specific keyword: want to drink beer) relating to the "Image of a beer" is registered as the search condition. Further, text indicating content of the image (text data describing the beer provided at the store) is registered. That is, text describing a service provided relating to each image and provided at the store is registered. Further, in the field 20*e* of the uppermost record, an "Image of a private tatami room provided at the store" is registered as the image related to the store, information (category: Store capable of providing a private room, a seat, and a charter, and specific keywords: there is a private room) relating to "private tatami room" is registered as the search condition, and text indicating the content of the image (text data describing the private tatami room provided at the store) is registered. Here, the service is detailed information on the beer provided as described above or detailed information on the private room of the store.

In the shown example, the six fields 20*d*, 20*e*, 20*f*, 20*g*, 20*h*, and 20*i* are provided to register the images (thumbnail images) associated with the store, but the number of fields for registering the images is appropriately designed. Moreover, the registration of the images (thumbnail images) in the store database 20 is performed according to a request from the store side, but it is not necessary for the images to be registered in all of the fields 20*d*, 20*e*, 20*f*, 20*g*, 20*h*, and 20*i*. For example, the images (thumbnail images) associated with the store may be registered in the fields 20*d*, 20*e*, and 20*f*, and blank information (NULL), rather than the images (thumbnail images), may be registered in the fields 20*g*, 20*h*, and 20*i*.

Further, the display rank setting database 30 includes records including a field 30*a* in which the store ID is registered, and a field 30*b* for registering a display rank of specific keywords set by the store side (includes a plurality of records provided for each store), as illustrated in FIG. 3. This display rank setting database 30 is used to determine which of specific keywords the image of which is selected when a plurality of specific keywords is input as the search condition.

Here, the store ID registered in the field 30*a* is the same as that registered in the field 20*a* of the store database 20. Further, a specific keyword registered in the field 30*b* is the same as the specific keyword registered in the corresponding record (record in which the same store ID is registered) of the store database 20, and is obtained by associating a display rank with the specific keyword registered in the store database 20. The display rank is set according to a request from each store (arbitrarily set by a person in charge of the store). In the field 30*b* of the illustrated uppermost record, "display rank No. 1" is associated with the specific keywords "Want to drink beer", "Display rank No. 2" is associated with a specific keyword "Couple private room", "Display rank No. 3" is associated with a specific keyword "There is private room", "Display rank No. 4" is associated with a specific keyword "There is a charter", and "Display rank No. 5" is associated with a specific keyword "Want to drink wine".

In the field 30*b*, information representing content of the image is also associated with the specific keyword. This is provided such that an image is selectable when a plurality of images associated with the same specific keyword is registered in the store database 20.

Further, the free word conversion table 40 is provided such that an image to be displayed together with store information searched with a free word is selectable when the free word is input as the search condition.

Specifically, as illustrated in FIG. 4, the free word conversion table 40 includes records including a field 40*a* in which a free word is registered, and a field 40*b* in which a "category and specific keyword" corresponding to the free word registered in the field 40*a* is registered (includes a plurality of records provided for each free word). For example, in the illustrated uppermost record, free words "Drink together" are registered in the field 40*a*, and the category "Store capable of providing a private room, a seat, and a charter" and the specific keyword "There is a charter" are registered in the field 40*b*.

Next, a function processing unit of the server 1 will be described.

The control unit 10 controls the entire operation of the server 1, and receives various settings for the server 1.

The search processing unit 11 receives an input of a search condition from the user terminal 3, searches for the store database 20 based on the received search condition, and extracts the record in which the store information satisfying the search condition is registered. Further, a process to be performed by the search processing unit 11 will be described below.

Further, the information providing unit 12 acquires the "search condition" received from the search processing unit 11 and the record extracted by the search processing unit 11 (the record in which the store information satisfying the search condition is registered). The information providing unit 12 selects the "image and text" to be presented together with the store information using the acquired "search condition" and the record in which the store information satisfying the search condition is registered. Further, the information providing unit 12 generates a search result guide page 110 (FIG. 10) in which the acquired store information and the selected "image and text" information are included, outputs the search result guide page 110 to the user terminal 3 inputting the search condition such that the search result guide page 110 is displayed. A process to be performed by the information providing unit 12 will be described below in detail.

A hardware configuration of the server 1 is not limited to the configuration of this embodiment. For example, the server 1 includes a computer (one or a plurality of computers) including a CPU, an auxiliary storage device, a main storage device, a network interface, and an input and output interface. In this case, a program for realizing functions of the control unit 10, the search processing unit 11, and the information providing unit 12 is stored in the auxiliary storage device. Further, the above-described storage unit 13 is formed in a predetermined area of the auxiliary storage device. The functions of the control unit 10, the search processing unit 11, and the information providing unit 12 are realized by the CPU loading the program stored in the auxiliary storage device into the main memory and executing the program.

Figure 5:
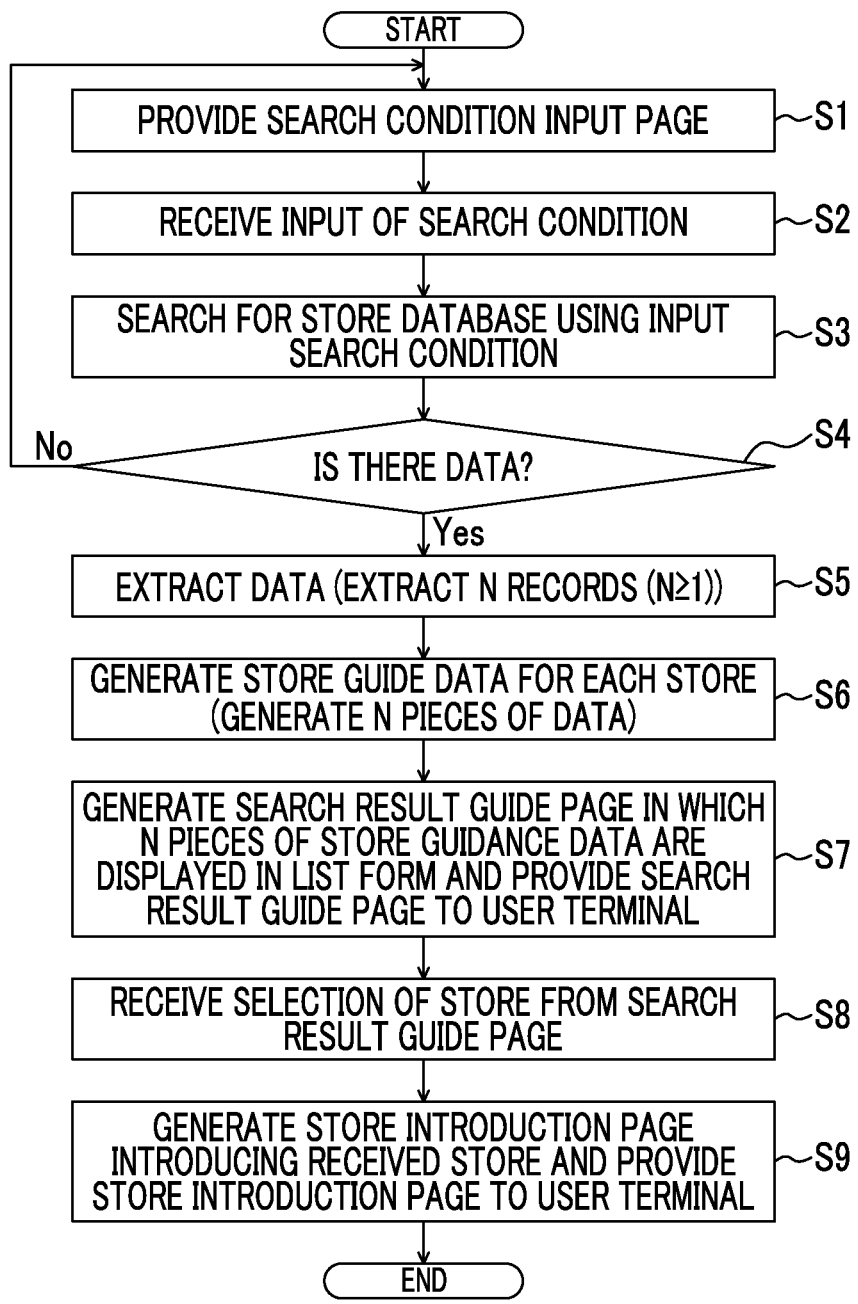
FIG. 5 is a flowchart illustrating a store information providing process performed by the information providing system of the embodiment of the present invention.
Figure 6:
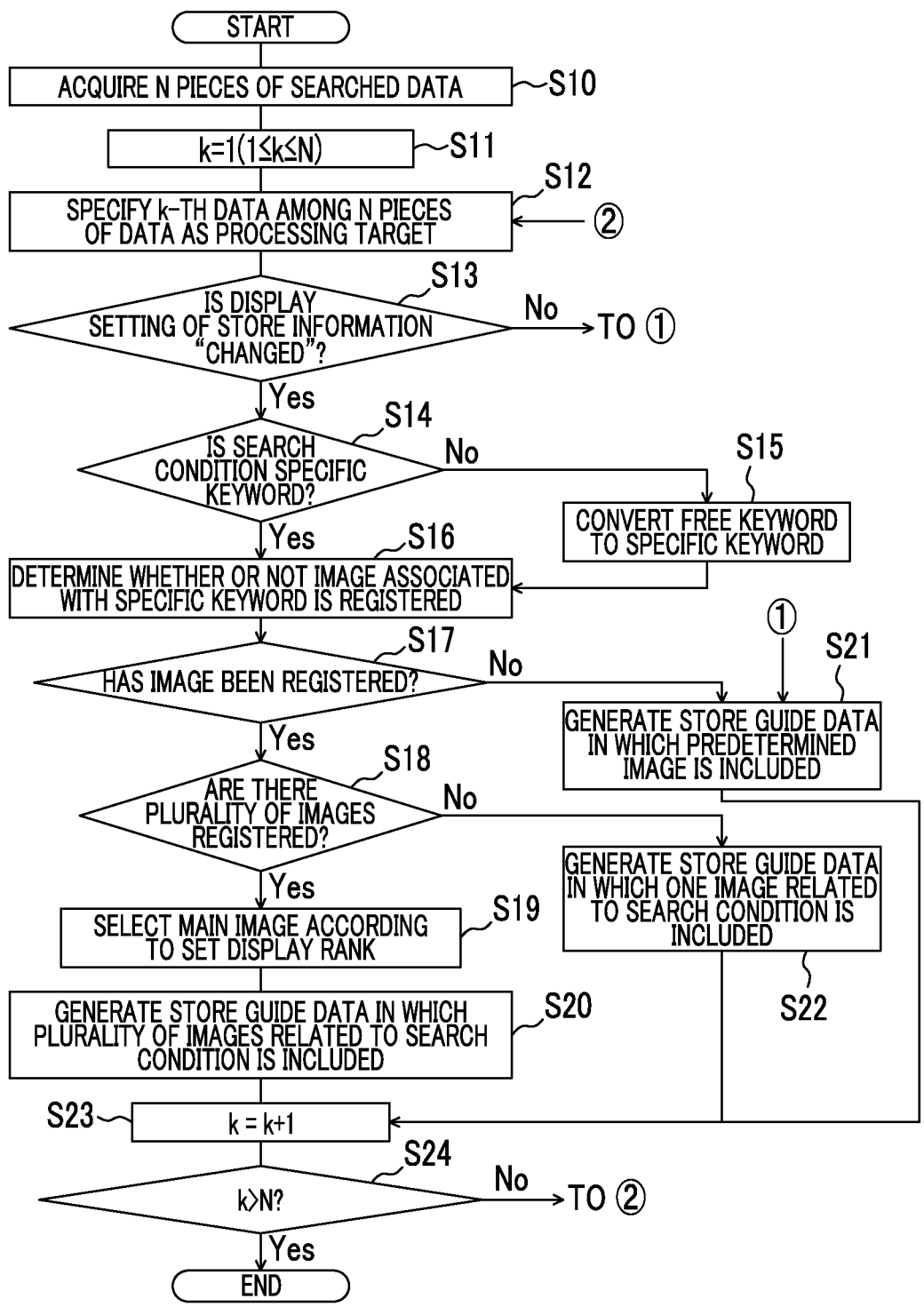
FIG. 6 is a flowchart specifically illustrating a process of S6 of FIG. 5.
Figure 7:
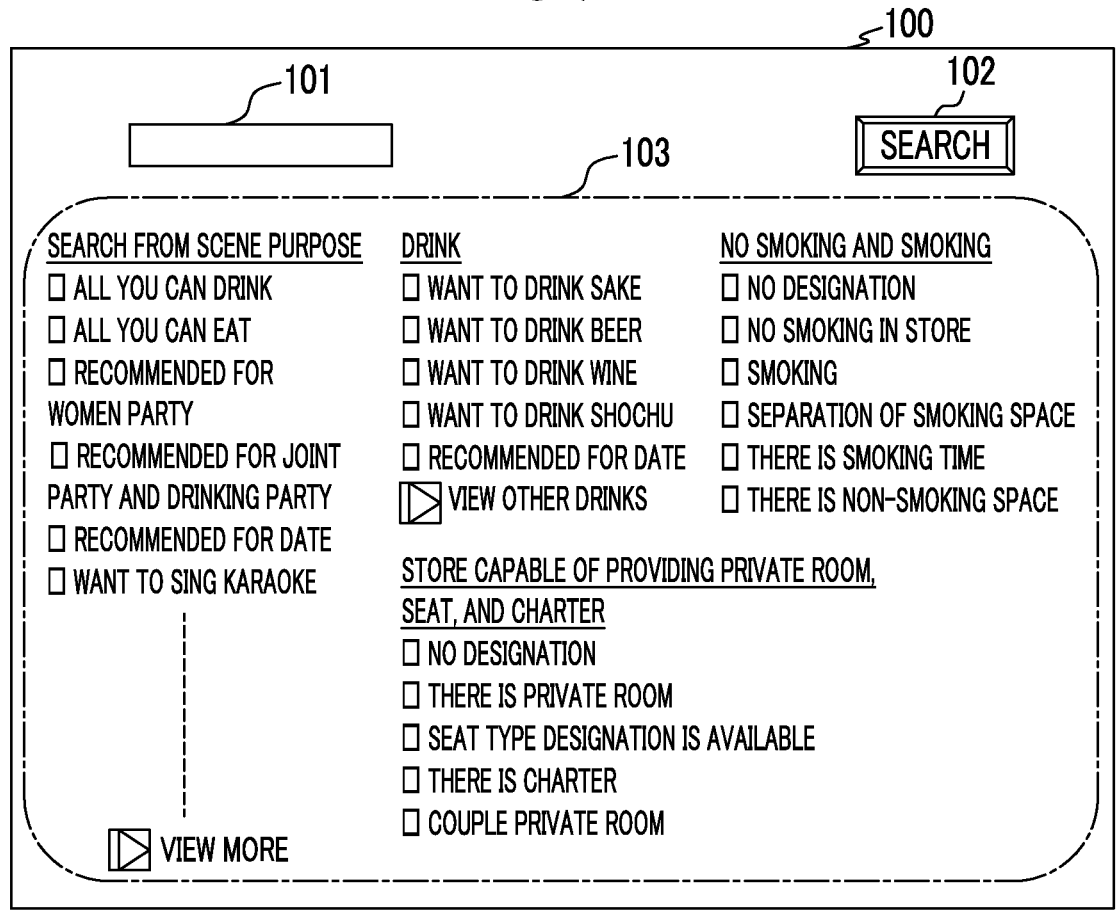
FIG. 7 is a schematic diagram illustrating a search condition input page provided by the information providing system of the embodiment of the present invention.
Figure 8:
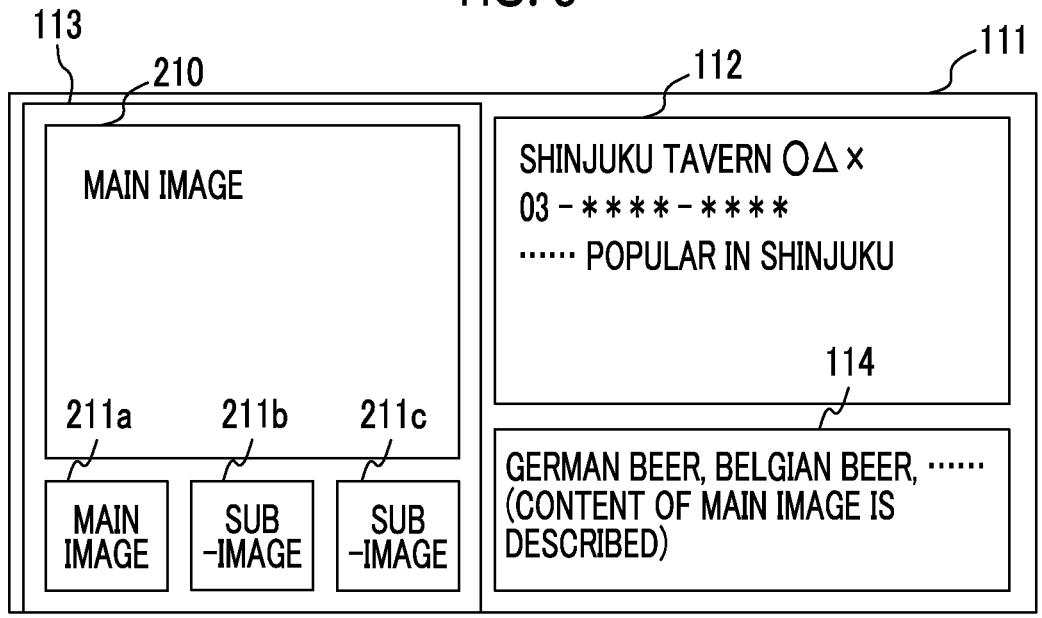
FIG. 8 is a schematic diagram illustrating store guide data constituting a search result guide page provided by the information providing system of the embodiment of the present invention.
Figure 10:
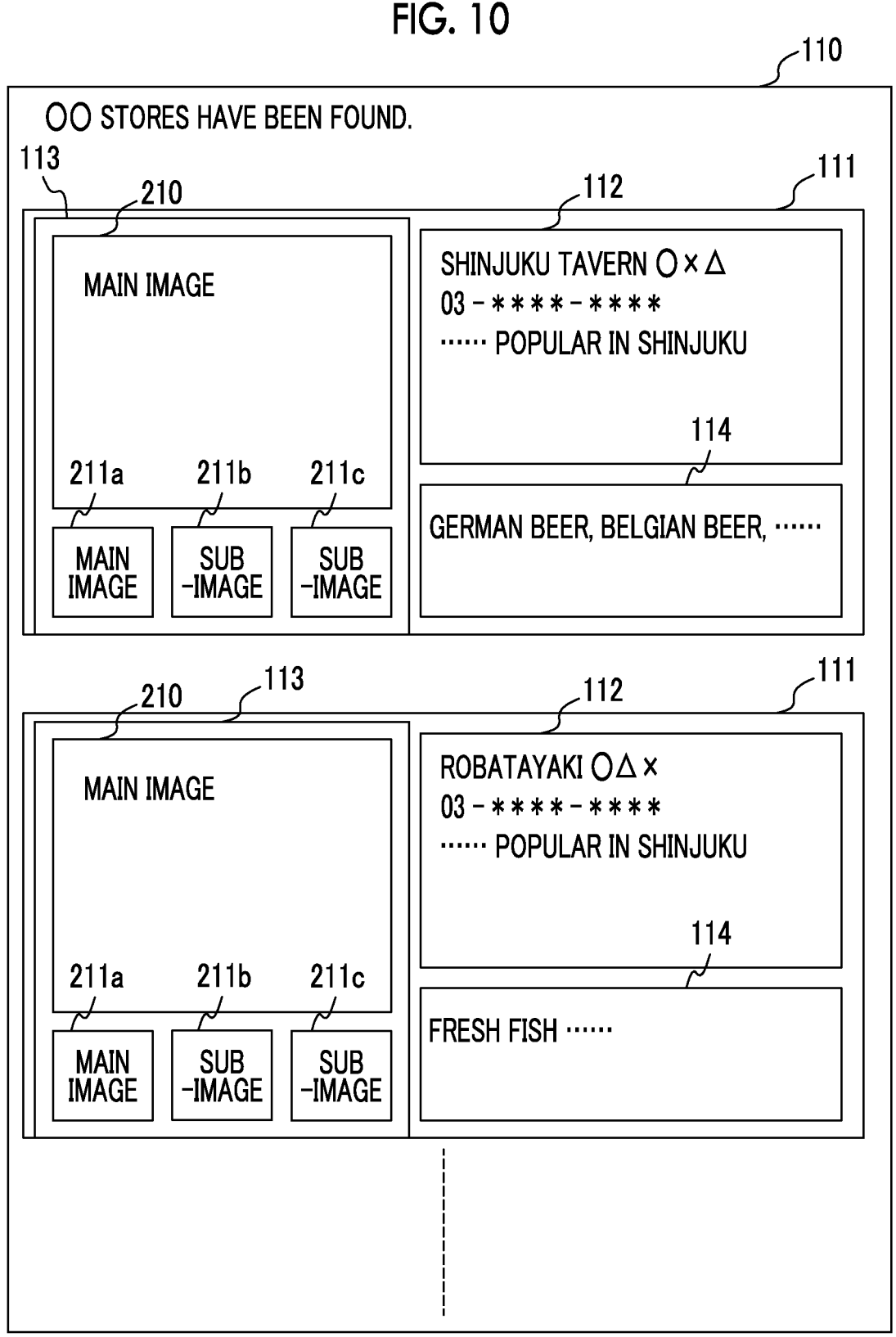
FIG. 10 is a schematic diagram illustrating a search result guide page provided by the information providing system of the embodiment of the present invention.
Figure 11:
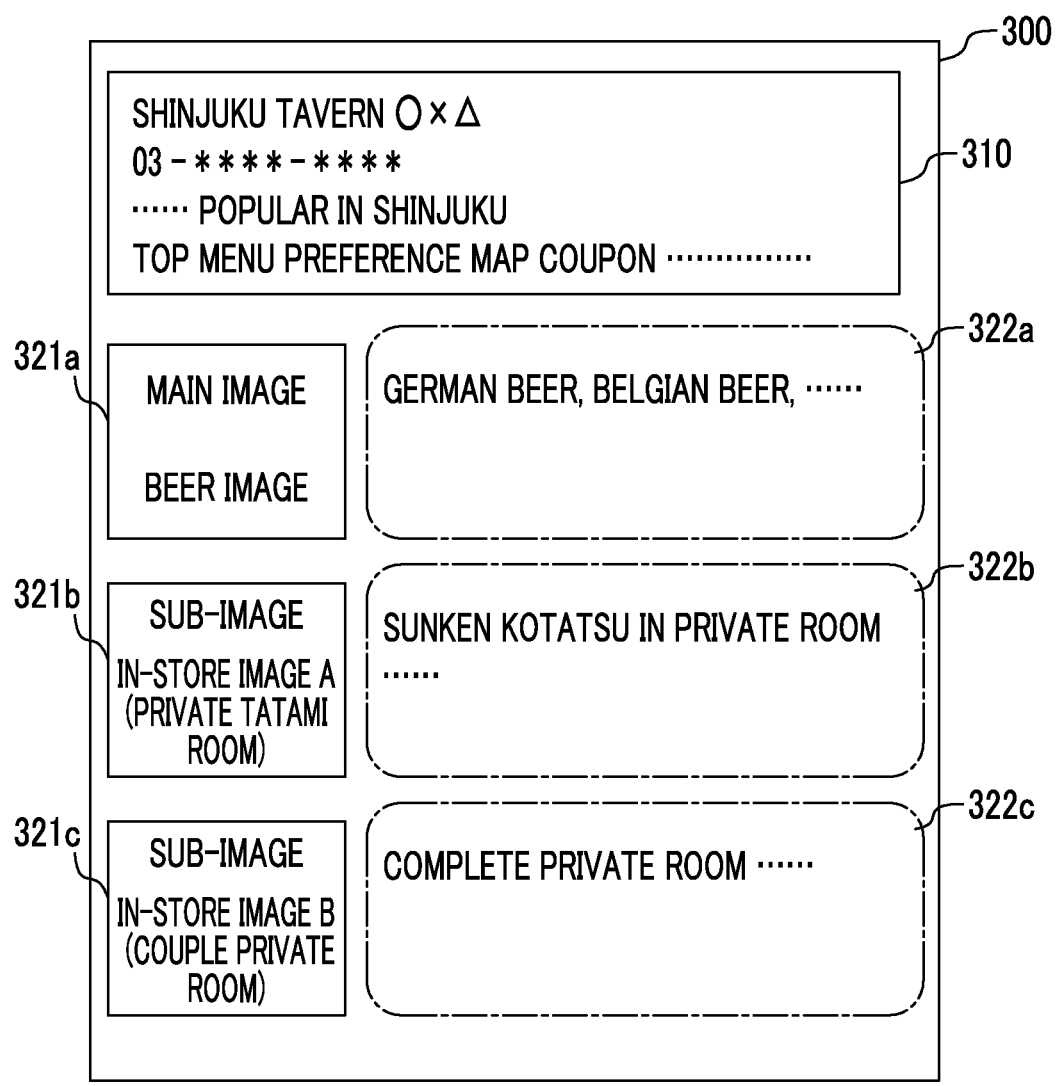
FIG. 11 is a schematic diagram illustrating a selected store introduction page provided by the information providing system of the embodiment of the present invention.
Figure 12:
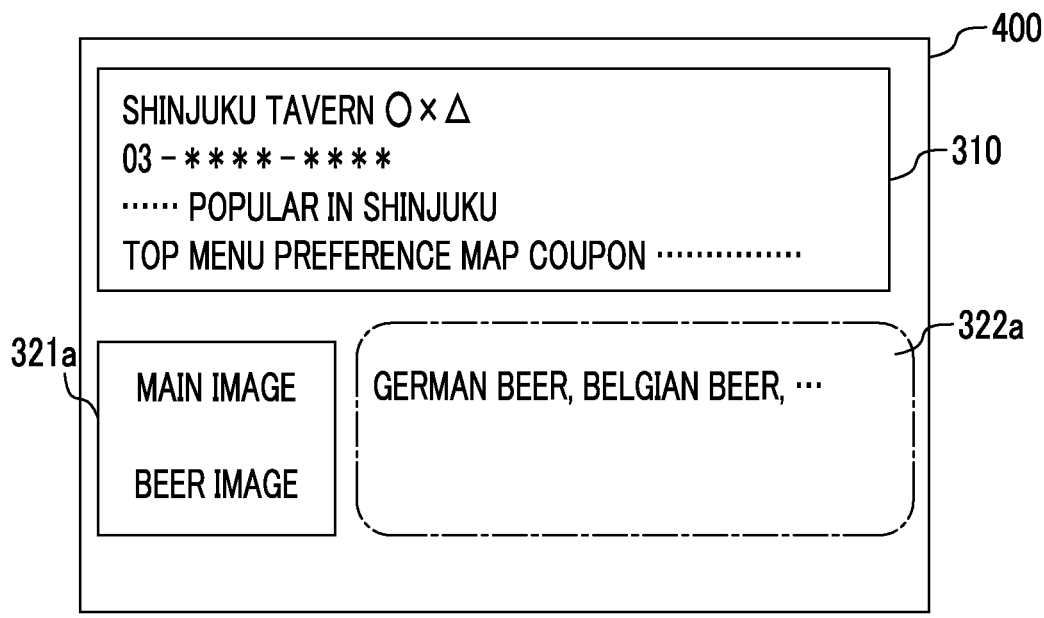
FIG. 12 is a schematic diagram illustrating a modification example of the selected store introduction page illustrated in FIG. 11.

Next, a process performed by the information providing system of this embodiment will be described with reference to FIGS. 5 to 12. Here, FIG. 5 is a flowchart illustrating a store information providing process performed by the information providing system of this embodiment. FIG. 6 is a flowchart specifically illustrating a process of S6 of FIG. 5. FIG. 7 is a schematic diagram illustrating a search condition input page provided by the information providing system of this embodiment. FIG. 8 is a schematic diagram illustrating store guide data constituting a search result guide page provided by the information providing system of this embodiment. FIGS. 9A to 9D are schematic diagrams illustrating an image layout of store guide data constituting a search result guide page provided by the information providing system of this embodiment. FIG. 10 is a schematic diagram illustrating a search result guide page provided by the information providing system of this embodiment. FIG. 11 is a schematic diagram illustrating a selected store introduction page provided by the information providing system of this embodiment. FIG. 12 is a schematic diagram illustrating a modification example of the selected store introduction page illustrated in FIG. 11.

First, the user who is looking for a store operates the user terminal 3 to access the server 1 and requests the search condition input page (web page) of a web site provided by the server 1. When the search processing unit 11 of the server 1 receives the request from the user terminal 3, the search processing unit 11 transmits a search condition input page 100 (FIG. 7) to the user terminal 3 (S1). Accordingly, the search condition input page 100 illustrated in FIG. 7 is displayed on the display unit of the user terminal 3.

In the illustrated search condition input page 100, a free word input field 101 that receives an input of a free word (search word) from the user, a search button 102 that receives a search process, and a specific keyword input field 103 that receives an input of a specific keyword (narrow keyword) for search prepared on the server 1 side are provided. In the specific keyword input field 103, specific keywords are classified and presented for each category, and the user can select and input a plurality of specific keywords. In the illustrated example, keywords such as "All you can drink" and "All you can eat" are presented as specific keywords classified in a category "Search from scene purpose", and keywords such as "Want to drink sake" and "Want to drink beer" are presented as specific keywords classified in a category "Drink". Further, keywords such as "No designation" and "There is a private room" are presented as specific keywords classified in a category "Store capable of providing a private room, a seat, and a charter", and keywords such as "No smoking in store" and "Smoking" are presented as specific keywords classified in a category "No smoking and smoking".

When the user operates the user terminal 3 to select a specific keyword on the search condition input page 100 (or input a free word) and clicks on the search button 102, search condition ("specific keyword and category" or "free word") input by the user is transmitted from the user terminal 3 to the server 1. The search processing unit 11 of the server 1 receives the search condition transmitted from the user terminal 3 to accept the search condition (S2). Information indicating whether the keyword input from the free word input field 101 is a free word is added to the keyword, and then, the resultant keyword is transmitted to the server 1. Accordingly, the search processing unit 11 and the information providing unit 12 of the server 1 can determine whether the keyword transmitted from the user terminal 3 is a free word or a specific keyword.

Next, the search processing unit 11 searches the store database 20 using the search condition received in S2, proceeds to S5 when there is a record satisfying the received search condition (a record in which store information including the specific keyword or the free word described therein is registered), and returns to S1 when there is no record satisfying the received search condition (S3 and S4).

In S5, the search processing unit 11 extracts all of records satisfying the received search condition (extracts N records (N 1)) from the store database 20, and transmits the received search condition and the extracted records (N records (N 1)) to the information providing unit 12.

In S6, the information providing unit 12 performs a process of acquiring the data (the search condition and the extracted N records) transmitted by the search processing unit 11, and generating store guide data 111 (see FIG. 8) in which store information, an image (thumbnail image) introducing the store, and text describing display content of the image are presented (generates N pieces of the store guide data 111), for each store (searched store) registered in the record extracted by the search processing unit 11.

As illustrated in FIG. 8, an area 112 in which the store information is presented, an area 113 in which an image introducing the store is presented, and an area 114, in which text describing display content of the image presented in the area 113 is presented, are formed in the store guide data 111. Further, in the area 113, a display area 210 of the main image is provided, and display areas 211a, 211b, and 211c smaller than the display area 210 are arranged in parallel and provided below the display area 210. In this embodiment, the same main image is displayed in the display area 210 and the display area 211a, and sub-images different from the main image are presented in the display areas 211b and 211c.

Further, the information providing system of this embodiment can set an image to be displayed in the area 113 to correspond to the search condition input by the user. That is, in this embodiment, the information providing system can perform setting so that, when the searched store information is provided to the user terminal 3, images related to the search condition and text describing content of the images related to the search condition are presented according to the input search condition together with the store information. As a result, the user can simply determine whether the searched store information is information satisfying the search condition input by the user. Hereinafter, a process of generating the store guide data 111 for each store in the information providing unit 12 (process S6) will be described with reference to FIG. 6.

Specifically, the information providing unit 12 acquires the search condition and the N records transmitted by the search processing unit 11 (S10), sets a value of a counter for measuring the number of processings of the acquired records to "1 (k=1 (1≤k≤N))" (S11), and proceeds to the process of S12. The information providing unit 12 imparts a number from 1 to N to the acquired N records.

In S12, the information providing unit 12 specifies the "k-th" record among the acquired N records as a processing target of the store guide data 111, and performs processes of S13 to S24 below on the "k-th" record.

In a process of generating the store guide data 111, the information providing unit 12 first confirms the display setting of the store information registered in the record specified as the processing target, proceeds to S14 when the display setting is "changed", and proceeds to S21 when the display setting is "fixed" (S13).

Specifically, in S13, the information providing unit 12 determines whether the store information registered in the record has a setting to change and display an image by referring to the field 20c of the record that is the specified processing target, proceeds to S14 when the store information has a setting to change and display an image (when "changed" is registered in the field 20c), and proceeds to a process of S21 when the store information does not have a setting to change and display an image (when "fixed" is registered in the field 20c). A setting regarding whether or not an image is changed and displayed is performed in response to a request from the store which registers the store information, and "changed or fixed" is registered in the field 20c of each record.

In S14, the information providing unit 12 determines whether or not the search condition received by the search processing unit 11 in S2 is "specific keyword", proceeds to S16 and S17 when the search condition is "specific keyword", and to S15 when the search condition is not "specific keyword" (that is, when the search condition is a free word). In S2, when the information providing unit 12 receives a plurality of keywords (specific keywords or free words), the information providing unit 12 performs the processes of S14 to S17 for each keyword.

In S15, the information providing unit 12 accesses the free word conversion table 40 (FIG. 4), and converts the received free word to a specific keyword. For example, when the search condition received in S2 is a free keyword "drink together", the information providing unit 12 converts the free word to the specific keyword "There is a charter" in the category "Store capable of providing a private room, a seat, and a charter" by referring to the uppermost record of the free word conversion table 40.

In S16 and S17, the information providing unit 12 determines whether or not an image associated with the specific keyword received in S2 (or specific keyword converted in S12) is registered in the fields 20d, 20e, 20f, 20g, 20h, and 20i of the record that is the processing target specified in S12 (the record searched in the search processing unit 11), proceeds to S18 when the image associated with the specific keyword is registered, and proceeds to S21 when the image associated with the specific keyword is not registered. When input of a plurality of specific keywords is received, the information providing unit 12 determines whether or not an image associated with the specific keyword is registered in the fields 20d, 20e, 20f, 20g, 20h, and 20i for each specific keyword. When there is no associated image, the process proceeds to S21.

In S18, the information providing unit 12 determines whether or not there are a plurality of images determined in S16 and S17, proceeds to S19 when there are a plurality of images, and proceeds to S22 when there are no plurality of images (when there is one image associated with the specific keyword).

In S19, the information providing unit 12 performs a process of specifying a main image and a sub-image on the plurality of images associated with the specific keyword using the display rank set in the display rank setting database 30. Further, in this step, when there are four or more images determined in S16 and S17, the information providing unit 12 performs a process of narrowing down (selecting) images to be presented together with the store information among the four or more images into three in a descending display rank using the display rank, as a process of a previous step for specifying of a main image and sub-images.

Here, the process of S19 will be divided into a case in which there are four or more images (images associated with the search condition) determined in S16 and S17 and a case in which there are three or less (here, two or three) images and will be described.

First, the process of S19 when there are four or more images determined in S16 and S17 (image associated with the search condition) will be described. In this case, the information providing unit 12 first reads the display rank associated with the same store ID as the store ID registered in the field 30a of the record (the record of the display rank setting database 30) which is the processing target from the display rank setting database 30 (FIG. 3). Then, using the read display rank, the information providing unit 12 imparts a rank to the specific keyword associated with the image according to the display rank, and selects the image associated with the three upper specific keywords as an image to be presented together with the store information.

Figure 9A:
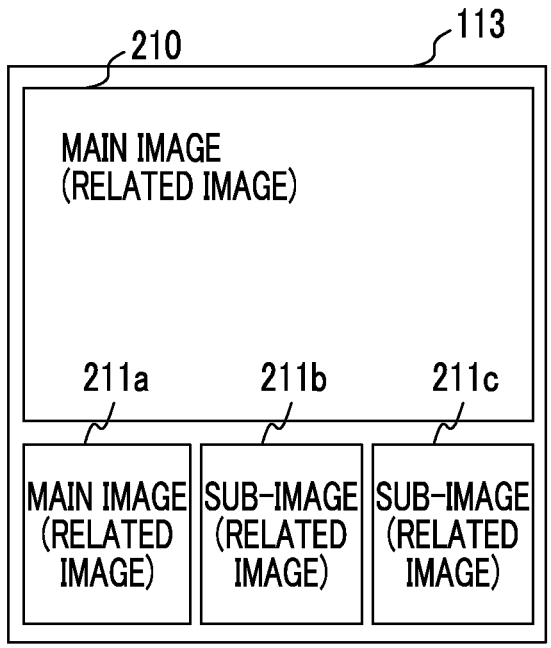
FIGS. 9A to 9D are schematic diagrams illustrating an image layout of store guide data constituting a search result guide page provided by the information providing system of the embodiment of the present invention.

The three selected images are arranged as illustrated in FIG. 9A in the area 113 in which the images introducing the store in the store guide data 111 illustrated in FIG. 8 are presented. Specifically, an image associated with the specific keyword with the rank of No. 1 is displayed as a main image in the display area 210 and the display area 211a, an image associated with the specific keyword with an rank of No. 2 is displayed as a sub-image in the display area 211b, and an image associated with the specific keyword with an rank of No. 3 is displayed as a sub-image in the display area 211c. Thus, in the case illustrated in FIG. 9A, the images presented in the area 113 are all images associated with the specific keyword. In this step, the information providing unit 12 also performs extraction of text associated with the specific keyword with a highest rank.

Next, the process of S19 when there are three or less images determined in S16 and S17 (image associated with the search condition) will be described. In this case, the information providing unit 12 reads the display rank associated with the same store ID as the store ID registered in the field 30a of the record that is the processing target from the display rank setting database 30 (FIG. 3), similar to the case in which there are four or more images. Using the read display rank, the information providing unit 12 imparts a rank to the specific keywords associated with the image in a descending the display rank. Further, the information providing unit 12 extracts text associated with the specific keyword with the highest rank.

Figure 9B:
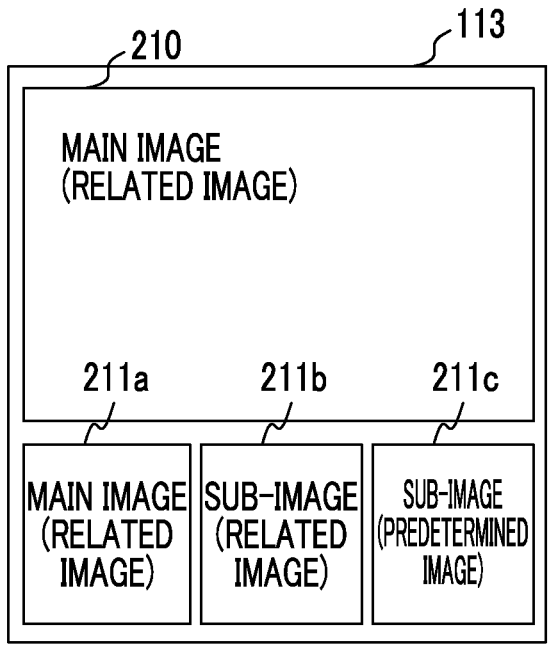

When there are three images determined in S16 and S17, the images associated with the specific keyword are displayed according to the display rank, similar to FIG. 9A, whereas when there are two images, the images associated with the specific keyword are preferentially arranged in the display area 210 and the display areas 211a and 211b in the store guide data 111, and a predetermined image is displayed in the other display area 211c, as illustrated in FIG. 9B. Specifically, the image associated with the specific keyword with the rank of No. 1 is displayed as a main image in the display area 210 and the display area 211a, an image associated with the specific keyword with the rank of No. 2 is displayed as a sub-image in the display area 211b, and the predetermined image among the images registered in the record that is a processing target is displayed in the display area 211c. This predetermined image is an image to be displayed when there is no image associated with the search condition and is determined in advance (for example, an image registered in any one of the fields 20d, 20e, 20f, 20g, 20h, and 20i of the record is determined as an image to be displayed when there is no image associated with the search condition).

Next, a process of S20 to be performed after the process of S19 will be described.

In S20, the information providing unit 12 generates the store guide data 111 (see FIG. 8) in which the "store information" registered in the record that is the processing target (the record of the display rank setting database 30 searched using the search condition), the "main image and the sub-images" specified in S19, and the "text representing content of the main image" extracted in S19 are presented.

Here, the processes of S19 and S20 in an example in which the search conditions received in S2 are four specific keywords ("Want to drink beer," "There is a private room", "Couple private room", and "Want to drink wine"), and the uppermost record of the store database 20 illustrated in FIG. 2 is extracted as the store information satisfying this specific keyword will be described.

In the extracted record, respective images are associated with the four specific keywords ("Want to drink beer," "There is a private room," "Couple private room", and "Want to drink wine") that are search conditions. In this case, the information providing unit 12 accesses the display rank setting database 30, and reads the display rank (display rank No. 1: Want to drink beer, display rank No. 2: Couple private room, display rank No. 3: There is private room, display rank No. 4: There is a charter, and display rank No. 5: Want to drink wine) associated with a store ID (S00**1) registered in the uppermost record of the store database 20. The information providing unit 12 selects the three specific keywords with high display rank from among the four specific keywords ("Want beer drink", "There is a private room", "Couple private room", and "Want to drink wine") using the read display rank. Here, "Want to drink beer," "Couple private room", and "There is a private room" are selected.

The information providing unit 12 extracts "images" associated with the three selected specific keywords from the uppermost record of the store database 20. The extracted images become images to be presented together with the store information. Further, the information providing unit 12 performs imparting of a rank of the three specific keywords. Here, No. 1 is imparted to "Want to drink beer," No. 2 is imparted to "Couple private room", and No. 3 is imparted to "There is a private room". The information providing unit 12 determines an image of the beer associated with "Want to drink beer" that is the specific keyword having display rank of No. 1 to be a main image. Further, the information providing unit 12 determines an image of a couple private room associated with "Couple private room" that is the specific keyword and an image of a private tatami room associated with "There is a private room" that is the specific keyword to be sub-images. Further, the information providing unit 12 extracts text associated with the specific keyword (want to drink beer) with a highest rank (text describing content of the beer).

Then, the information providing unit 12 generates the store guide data 111 in which the area 112 in which the store information registered in the field 20b of the uppermost record of the store database 20 is presented, the area 113 in which the image of the beer is displayed as the main image, and the image of the couple private room and the image of the private tatami room are displayed as sub-images, and the area 114 in which text describing the content of the beer that is the main image is presented are provided. In the example illustrated in FIG. 8, the "Image of the beer" of No. 1 is displayed as the main image in the display area 210 and the display area 211a, the image of the "Couple private room" of No. 2 is displayed as the sub-image in the display area 211b, and the "Image of private tatami room" of No. 3 is displayed as a sub-image in the display area 211c.

Next, processes of S23 and S24 to be performed after the process of S20 will be described.

In S23 and S24, the information providing unit 12 increases the value of the counter for measuring the processing number of records by "1" (k=k+1), and determines whether or not the value of the counter is greater than "N". Since the processing for all of the N records acquired in S10 ends when the counter value is greater than "N" (k>N), the information providing unit 12 proceeds to a process of S7 in FIG. 5. On the other hand, since the N records acquired in S10 include unprocessed records when the counter value is smaller than or equal to "N" (k≤N), the information providing unit 12 returns to the process of S12.

Next, a process of S21 to be performed when it is determined in S13 that the display setting of the store information is to be fixed and when it is determined in S17 that there is no image associated with the specific keyword (search condition) will be described.

In S21, the information providing unit 12 extracts three predetermined images from the fields 20d, 20e, 20f, 20g, 20h, and 20i of the record specified as the processing target from the records that are processing targets. Further, the information providing unit 12 determines one of the three images to be a main image, and extracts text describing the content of the main image from the field in which the main image is registered. The information providing unit 12 generates the store guide data 111 (see FIG. 8) in which "store information" registered in the record that is the processing target (the record of the display rank setting database 30 searched with the search condition), the "main image and sub-images" extracted as described above, and the extracted "text indicating the content of the main image", are present. When the process of S21 ends, the information providing unit 12 performs the processes S23 and S24, described above.

Figure 9C:
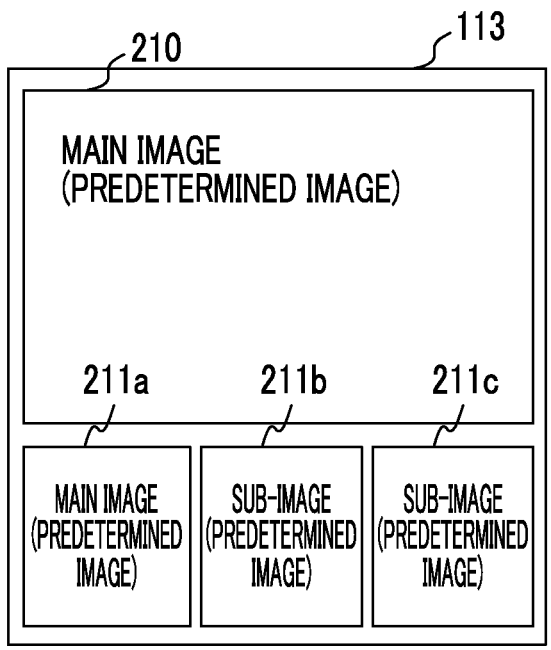

Here, the process of S21 in an example in which the image registered in the field 20d is a main image, and images registered in the fields 20e and 20f are sub-images will be described. In this case, the area 113 in which the image introducing the store is presented in the store guide data 111 is arranged as illustrated in FIG. 9C. Specifically, as illustrated in FIG. 9C, the image registered in the field 20d is displayed as the main image in the area 210 and the area 211a, the image registered in the field 20e is displayed as the sub-image in the area 211b, and the image registered in the field 20f is displayed as the sub-image in the area 211c.

With this configuration, the store registering the store information can cope with, for example, a case in which the store wants to display a desired image regardless of the search condition. Moreover, even when images related to the search condition are not registered, it is possible to display images introducing the store together with the store information.

Next, a process of S22 to be performed when the number of images associated with the specific keyword is determined to be one in S18 will be described.

In S22, the information providing unit 12 specifies and extracts the image associated with the specific keyword as the main image, and extracts text describing the content of the image from the field in which the image is registered. Further, the information providing unit 12 extracts two predetermined images as sub-images from the fields 20d, 20e, 20f, 20g, 20h, and 20i of the record specified as the processing target. The information providing unit 12 generates the store guide data 111 (see FIG. 8) in which "store information" registered in the record that is the processing target (the record of the display rank setting database 30 searched with the search condition), the "main image and sub-images" extracted as described above, and the extracted "text indicating the content of the main image" are present. When the process of S21 ends, the information providing unit 12 performs the processes S23 and S24 described above.

Figure 9D:
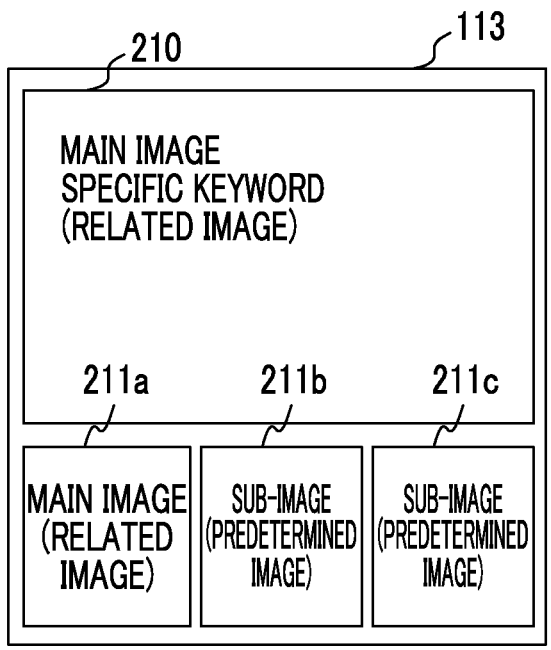

In S22, the area 113 in the store guide data 111 is arranged as illustrated in FIG. 9D. Specifically, as illustrated in FIG. 9D, the image determined to be associated with the specific keyword in S16 and S17 is displayed as a main image in the display area 210 and the display area 211a, and a predetermined image that has been determined in advance among the images registered in the record that is the processing target is displayed in the display areas 211b and 211c.

Processes of S7 and subsequent steps to be performed after the process of S6 will be described with reference to FIG. 5.

In S7, the information providing unit 12 generates a search result guide page 110 (FIG. 10) in which N pieces of the store guide data 111 generated in S6 are arranged side by side to be selectable and presented in a list form, transmits the search result guide page 110 to the user terminal 3, and proceeds to S8. Accordingly, the search result guide page 110 is displayed on the display unit of the user terminal 3.

In the search result guide page 110, the store guide data 111 in which the store information searched based on the search condition input by the user, images (thumbnail images) introducing the store, and the text describing display content of the images presented is displayed to be selectable in a list form, as illustrated in FIG. 10. In this embodiment, when the search condition input by the user matches the search condition associated with the image of the store database 20, an image or the like associated with the input search condition is displayed in the area 113 of each piece of store guide data 111. For the images or the search condition registered in the store database 20, data that the store side considers to want to PR is generally registered. Therefore, when the image displayed in the area 113 of the store guide data 111 is an image related to the search condition input by the user, requirements desired by the user are highly likely to match characteristics of the store that the store side considers to want to PR. Therefore, the user is highly likely to select a desired store by selecting the store of the image associated with the search condition input by the user. Further, in this embodiment, it is possible to simply visually determine which store information, in which images related to the search condition are displayed, matches the user's desired one.

In S8, the information providing unit 12 receives a selection of the store on the search result guide page 110 from the user terminal 3. Specifically, the user operates the user terminal 3 to select one store (for example, click on a store name in the area 112) from the store guide data 111 displayed in a list form on the search result guide page 110. Accordingly, a store introduction page providing a request for the store selected by the user is transmitted from the user terminal 3 to the server 1, and the information providing unit 12 of the server 1 receives the store introduction page providing a request from the user terminal 3. Data representing the store selected by the user and identifying the store guide data 111 is included in the store introduction page providing request.

In S9, the information providing unit 12 generates a store introduction page 300 introducing the received store (FIG. 11) according to the received store introduction page providing request. The store introduction page 300 is displayed for the user terminal 3.

Here, in the store introduction page 300 illustrated in FIG. 11, an area 310 in which the store information is presented, an area 321a in which the main image shown in the area 211a of the store guide data 111 is displayed, an area 322a in which text describing content of the main image (the text shown in the store guide data 111) is displayed, an area 321b in which the sub-image shown in the area 211b of the store guide data 111 is displayed, an area 322b in which text describing the content of the sub-image shown in the area 321b is displayed, an area 321c in which the sub-image shown in the area 211c of the store guide data 111 is displayed, and an area 322c in which the text describing the content of the sub-image shown in the area 321c is displayed, are provided. The text of the areas 322b and 322c are read from the record in which the store information registered in the area 310 is registered, through access of the store database 20.

Thus, the user can see whether the image presented in the store introduction page 300 is an image associated with the search condition input by the user on a large screen, and easily determine whether or not the image satisfies the search condition input by the user. Further, in the store introduction page 300, the sub-images are also displayed on a large screen, and text describing the content of the sub-images is also displayed. Therefore, when the user inputs a plurality of search conditions (specific keywords), an image associated with the search condition is displayed as not only the main image, but also as the sub-image. Accordingly, a store satisfying his or her desired conditions is easily found.

The store introduction page 300 described above is only one example. For example, the server 1 may provide a store introduction page 400 as illustrated in FIG. 12.

The area 310 in which the store information is presented, the area 321a in which the main image shown in the area 211a in the store guide data 111 is displayed, and the area 322a in which text describing content of the main image (text shown in the store guide data 111) is displayed, are provided at the store introduction page 400 illustrated in FIG. 12.

According to this configuration, since only the image displayed as the main image and the text describing the content of the main image are displayed, the image associated with the specific keyword of which the display rank is set to be high by the store side is displayed, a point of service that the store side considers to want to PR is arranged, and the store can be introduced to the user.

Further, while the main image and the sub-images are displayed in the store introduction page 300 described above, only images (main image and sub-image) associated with the search condition and text describing the images may be displayed. Further, while the area 310 in which the store information is presented is provided at the store introduction page 300 described above, the store introduction page 300 may have a page configuration in which the area 310 is not formed.

As described above, according to this embodiment, it is possible to provide the server 1 capable of simply determining whether or not a search result corresponding to the search condition input by the user is provided.

The present invention is not limited to the above-described embodiments, and various modifications are available within the scope of the invention.

For example, in the above-described embodiments, the image (thumbnail image) introducing the store and the text describing the display content of the image are presented in each piece of the store guide data 111 of the search result guide page 110, but the present invention is not limited to this configuration. In each piece of the store guide data 111 of the search result guide page 110, only the image (thumbnail image) introducing the store may be presented as the data presented together with the searched store information. That is, the search result guide page 110 may have a page configuration in which the text describing the display content of the image is not presented.

Further, for example, in the store guide data 111 (see FIG. 8) of the above-described embodiment, the main image is displayed in the display area 210 and the display area 211a, and the sub-images different from the main image are presented in the display areas 211b and 211c. However, this configuration is only an example. For example, the sub-images may be displayed on three or more screens. Further, the display area 210 and the display areas 211a, 211b, and 211c may have the same size.

Figure 13:
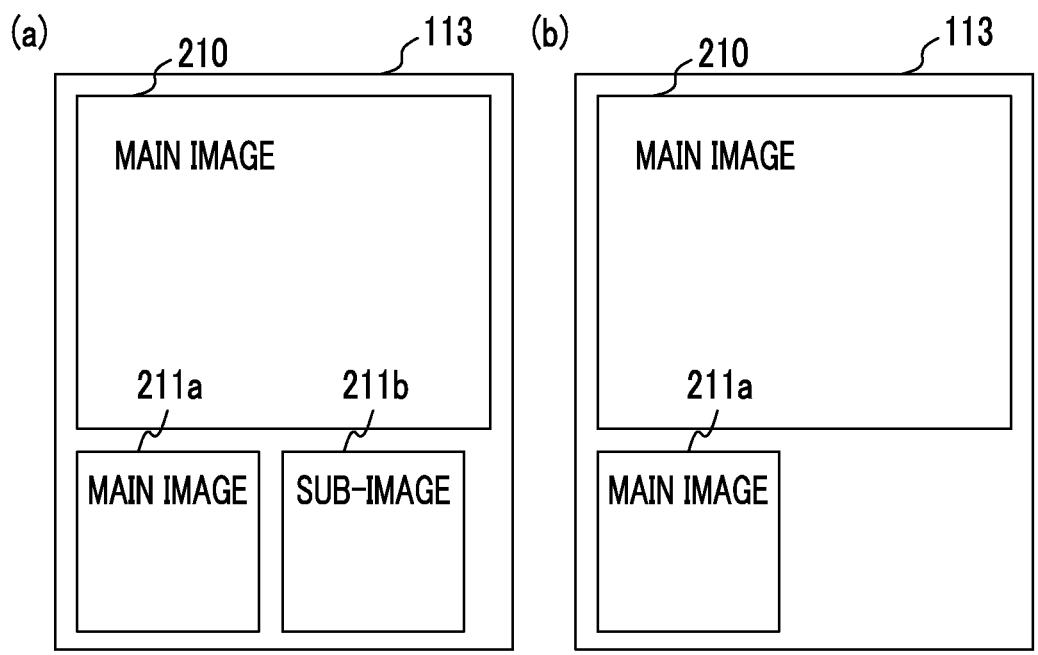
FIGS. 13A and 13B are schematic diagrams illustrating another example of an image layout of the store guide data illustrated in FIGS. 9A to 9D.

Further, when there is a store of which only two images are registered in the store database 20, the display area 211c may not be provided in the area 113 of the store guide data 111 (see FIG. 8), as illustrated in FIG. 13A. Further, when there is a store of which only one image is registered in the store database 20, only the main image may be displayed, as illustrated in FIG. 13B.

Further, in the above-described embodiment, when the image associated with the specific keyword input by the user is registered in the record in which the searched store information is registered, the image (the image with the highest display rank set by the store side when there are a plurality of images) is presented as the main image of the store guide data 111. However, the present invention is not limited to this configuration. For example, when the image associated with the specific keyword input by the user is registered in the record in which the searched store information is registered, the information providing unit 12 may generate the store guide data 111 in which the image is present as a sub-image (a predetermined image is presented as the main image). In this case, text describing the content of the sub image may be presented in the area 114 of the store guide data 111.

Further, while the case in which the search target information is the store information has been shown in the above-described embodiment, the store information is only one example of the search target information. For example, the search target information may be a facility of product information, real estate information, or the like.

What is claimed is:
1. An information providing server comprising:
a network communication interface;
a memory that stores a database that includes facility information for a plurality of facilities, each of the plurality of facilities being identified by a facility ID, the facility information for each facility including a plurality of images each related to a different service provided by the respective facility and each of the plurality of images associated with different keywords of a plurality of keywords, the plurality of keywords being text describing the respective image related to the respective facility and the respective service provided at the respective facility, each of the plurality of keywords includes a predetermined rank that determines which keyword of the plurality of keywords associated with the respective images is selected when at least one keyword of the plurality of keywords is input as a search condition, and the plurality of images having a default display order in which they are to be displayed; and
a processor configured to:
receive, over a network via the network communication interface, an input of the at least one keyword as a specific search condition, from a user terminal, wherein the at least one keyword is descriptive of one or more of a plurality of different services provided by one or more of the plurality of facilities;
extract, from the database using the at least one keyword, all records of facility information satisfying the at least one keyword;
for each facility in the extracted records of facility information satisfying the at least one keyword:
determine a ranked display order of images associated with the at least one keyword based on the rank associated with the at least one keyword among the plurality of keywords;
determine, from among the stored images related to the facility, an image based on and representing content of a primary service of the one or more of the plurality of different services described by the at least one keyword received as the input and provided at the facility;
switch from the default display order of the stored images related to the facility to an order based on the ranked display order such that a default image that is displayed in a primary position is switched to the image associated with the at least one keyword;
generate search result guide data in which the determined image associated with the at least one keyword is included, wherein a subset of the plurality of images and text are included in the search result guide data, one of the subset of the plurality of images is a main image, which is the determined image corresponding to the service provided at the facility that is based on the primary service described by the at least one keyword, wherein the main image is configured to be displayed in the primary position of the search result guide data, and wherein at least one other image of the subset of the plurality of images is a second image and is based on and represents content of a secondary service of the one or more of the plurality of different services described by a second keyword having a rank that is a highest default rank in the default display order among the plurality of keywords, and is configured to be displayed in a secondary position of the search result guide data; and transmit, over the network via the network communication interface, the search result guide data including the subset of the plurality of images including the image associated with the at least one keyword and the second image associated with the second keyword to the user terminal; and receive, over the network via the network communication interface, an input selecting one of the facilities in the extracted record, and as a result transmit an introduction page for the facility that includes the images corresponding to the service or services provided at the facility in the ranked display order.

2. The information providing server according to claim 1, wherein: the subset of the plurality of images included in the search result guide data include images other than the main image that are sub-images smaller than the main image.

3. The information providing server according to claim 1, wherein:

the search result guide data is data in which the determined image and text associated with the determined image are presented in a list form to be visually associated with each other and arranged to be selectable for each piece of extracted facility information, and the processor is further programmed to:

generate introduction data that associates the determined image and the text associated with the determined image with the search condition used for extraction of selected facility information, and causes the introduction data to be provided, to the user terminal, when the user terminal selects the facility information presented in a list form on the search result guide data.

4. The information providing server according to claim 3, wherein the introduction data is a facility introduction page of the facility.

5. The information providing server according to claim 1, wherein:

the search result guide data is data in which the determined image and associated text are presented in a list form to be associated with each other and arranged to be selectable for each piece of extracted facility information, and the processor is further programmed to:

generate introduction data that associates the selected image and the text associated with the determined image with the search condition used for extraction of selected facility information, and cause the introduction data to be displayed by the user terminal, when the user terminal selects the facility information presented in a list form on the search result guide data.

6. The information providing server according to claim 5, wherein the introduction data is a facility introduction page of the facility.

7. The information providing server according to claim 1, wherein the facilities are stores.

8. The information providing server according to claim 7, wherein the stores are restaurants.

9. The information providing server according to claim 1, wherein the transmitting of the introduction page further includes transmitting the subset of the plurality of images at a region below the top region of the introduction page.

10. The information providing server according to claim 1, wherein the subset of the plurality of images and text included in the search result guide data includes the main image, the second image, and at least a third image associated with at least one of the primary service, the secondary service, or a tertiary service.

11. The information providing server according to claim 10, wherein the subset of the plurality of images are displayed according to the ranked display order, and are configured to be switched in order with one another or with others of the plurality of images based on input of one or more of the plurality of keywords other than the at least one keyword.

12. A non-transitory computer-readable medium comprising computer-executable instructions that, when executed by a processor, cause the processor to:

receive, over a network via a network communication interface, an input of at least one keyword as a specific search condition, from a user terminal, wherein the at least one keyword is descriptive of one or more of a plurality of different services provided by one or more of a plurality of facilities;

extract, from a database using the at least one keyword, all records of facility information satisfying the at least one keyword, the database being stored in a memory and including facility information for the plurality of facilities, each of the plurality of facilities being identified by a facility ID, the facility information for each facility including a plurality of images each related to a different service provided by the respective facility and each of the plurality of images associated with different keywords of a plurality of keywords, the plurality of keywords being text describing the respective image related to the respective facility and the respective service provided at the respective facility, each of the plurality of keywords includes a predetermined rank that determines which keyword of the plurality of keywords associated with the respective images is selected when the at least one keyword of the plurality of keywords is input as a search condition, and the plurality of images having a default display order in which they are to be displayed; and for each facility in the extracted records of facility information satisfying the at least one keyword:

determine a ranked display order of images associated with the at least one keyword based on the rank associated with the at least one keyword among the plurality of key words;

determine, from among the stored images related to the facility, an image based on and representing content of a primary service of the one or more of the plurality of different services described by the at least one keyword received as the input and provided at the facility;

switch from the default display order of the stored images related to the facility to an order based on the ranked display order such that a default image that is displayed in a primary position is switched to the image associated with the at least one keyword;

generate search result guide data in which the determined image associated with the at least one keyword is included, wherein a subset of the plurality of images and text are included in the search result guide data, one of the subset of the plurality of images is a main image, which is the determined image corresponding to the service provided at the facility that is based on the primary service described by the at least one keyword, wherein the main image is configured to be displayed in the primary position of the search result guide data, and wherein at least one other image of the subset of the plurality of images is a second image and is based on and represents content of a secondary service of the one or more of the plurality of different services described by a second keyword having a rank that is a highest default rank in the default display order among the plurality of keywords, and is configured to be displayed in a secondary position of the search result guide data; and transmit, over the network via the network communication interface, the search result guide data including the subset of the plurality of images including the image associated with the at least one keyword and the second image associated with the second keyword to the user terminal; and receive, over the network via the network communication interface, an input selecting one of the facilities in the extracted record, and as a result transmit an introduction page for the facility that includes the images corresponding to the service or services provided at the facility in the ranked display order.

13. A method comprising:

receiving, over a network via a network communication interface, an input of at least one keyword as a specific search condition, from a user terminal, wherein the at least one keyword is descriptive of one or more of a plurality of different services provided by one or more of a plurality of facilities;

extracting, from a database using the at least one keyword, all records of facility information satisfying the at least one keyword, the database being stored in a memory and includes facility information for the plurality of facilities, each of the plurality of facilities being identified by a facility ID, the facility information for each facility including a plurality of images each related to a different service provided by the respective facility and each of the plurality of images associated with different keywords of a plurality of keywords, the plurality of keywords being text describing the respective image related to the respective facility and the respective service provided at the respective facility, each of the plurality of keywords includes a predetermined rank that determines which keyword of the plurality of keywords associated with the respective images is selected when the at least one keyword of the plurality of keywords is input as a search condition, and the plurality of images having a default display order in which they are to be displayed; and for each facility in the extracted records of facility information satisfying the at least one keyword:

determining a ranked display order of images associated with the at least one keyword based on the rank associated with the at least one keyword among the plurality of keywords;

determining, from among the stored images related to the facility, an image based on and representing content of a primary service of the one or more of the plurality of different services described by the at least one keyword received as the input and provided at the facility;

switching from the default display order of the stored images related to the facility to an order based on the ranked display order such that a default image that is displayed in a primary position is switched to the image associated with the at least one keyword;

generating search result guide data in which the determined image associated with the at least one keyword is included, wherein a subset of the plurality of images and text are included in the search result guide data, one of the subset of the plurality of images is a main image, which is the determined image corresponding to the service provided at the facility that is based on the primary service described by the at least one keyword, wherein the main image is configured to be displayed in the primary position of the search result guide data, and wherein at least one other image of the subset of the plurality of images is a second image and is based on and represents content of a secondary service of the one or more of the plurality of different services described by a second keyword having a rank that is a highest default rank in the default display order among the plurality of keywords, and is configured to be displayed in a secondary position of the search result guide data; and transmitting, over the network via the network communication interface, the search result guide data including the subset of the plurality of images including the image associated with the at least one keyword and the second image associated with the second keyword to the user terminal; and receiving, over the network via the network communication interface, an input selecting one of the facilities in the extracted record, and as a result transmitting an introduction page for the facility that includes the images corresponding to the service or services provided at the facility in the ranked display order.

* * * * *